United States Patent
Burns

(10) Patent No.: US 10,572,486 B2
(45) Date of Patent: Feb. 25, 2020

(54) DATA COMMUNICATION IN A DISTRIBUTED DATA GRID

(71) Applicant: Red Hat, Inc., Raleigh, NC (US)

(72) Inventor: William Rosenquist Burns, Annapolis, MD (US)

(73) Assignee: Red Hat, Inc., Raleigh, NC (US)

(*) Notice: Subject to any disclaimer, the term of this patent is extended or adjusted under 35 U.S.C. 154(b) by 878 days.

(21) Appl. No.: 14/633,016

(22) Filed: Feb. 26, 2015

(65) Prior Publication Data
US 2016/0253391 A1    Sep. 1, 2016

(51) Int. Cl.
| | |
|---|---|
| G06F 16/2455 | (2019.01) |
| G06F 16/738 | (2019.01) |
| G06F 16/838 | (2019.01) |
| G06F 16/14 | (2019.01) |
| G06F 16/248 | (2019.01) |
| G06F 16/338 | (2019.01) |
| G06F 16/438 | (2019.01) |
| G06F 16/638 | (2019.01) |
| G06F 16/9038 | (2019.01) |

(52) U.S. Cl.
CPC ...... *G06F 16/24564* (2019.01); *G06F 16/156* (2019.01); *G06F 16/248* (2019.01); *G06F 16/2455* (2019.01); *G06F 16/338* (2019.01); *G06F 16/438* (2019.01); *G06F 16/638* (2019.01); *G06F 16/738* (2019.01); *G06F 16/838* (2019.01); *G06F 16/9038* (2019.01)

(58) Field of Classification Search
USPC .................................................. 707/722
See application file for complete search history.

(56) References Cited

U.S. PATENT DOCUMENTS

| | | | |
|---|---|---|---|
| 6,339,659 B1* | 1/2002 | Fukuhara | G06T 9/001 |
| | | | 382/242 |
| 7,984,043 B1* | 7/2011 | Waas | G06F 17/30932 |
| | | | 707/718 |
| 8,090,974 B1* | 1/2012 | Jain | H04L 41/5025 |
| | | | 714/21 |
| 8,719,307 B2 | 5/2014 | Surtani et al. | |

(Continued)

OTHER PUBLICATIONS

Ruzzi, Joseph, "Oracle® Coherence", https://docs.oracle.com/cd/E18686_01/coh.37/e18680.pdf, Apr. 2011, 118 pages.

(Continued)

*Primary Examiner* — Tamara T Kyle
*Assistant Examiner* — Raheem Hoffler
(74) *Attorney, Agent, or Firm* — Lowenstein Sandleer LLP

(57) ABSTRACT

A method of communicating data in a data grid. The method includes receiving, from an iterator in a data grid, a search request to search for data matching search criteria in a first memory coupled to a node. The method further includes searching, by a processor of the node, for data in the memory matching the search criteria to obtain result data. The method further includes communicating, by the processor, the result data to the iterator. The method further includes pausing communicating the result data to the iterator in view of a pause condition pertaining to the memory capacity threshold of the second memory. The method further includes, in response to a resume condition, resuming communicating the result data to the iterator.

18 Claims, 5 Drawing Sheets

(56) References Cited

U.S. PATENT DOCUMENTS

| | | | |
|---|---|---|---|
| 8,745,236 | B2 | 6/2014 | Battersby et al. |
| 10,198,324 | B2* | 2/2019 | Kottomtharayil ....... G06F 9/505 |
| 10,268,526 | B1* | 4/2019 | Martin .................... G06F 9/542 |
| 2005/0076018 | A1* | 4/2005 | Neidecker-Lutz .......................... G06F 17/30486 |
| 2009/0089339 | A1* | 4/2009 | Mitchell ................ G06Q 10/10 |
| 2012/0158805 | A1 | 6/2012 | Andre et al. |
| 2012/0197959 | A1 | 8/2012 | Oliver et al. |
| 2013/0074083 | A1 | 3/2013 | Oliver et al. |
| 2013/0238956 | A1* | 9/2013 | Grube ................ G06F 11/1092 714/763 |
| 2013/0318314 | A1 | 11/2013 | Markus |
| 2013/0325902 | A1* | 12/2013 | Bachar .............. G06F 17/30961 707/797 |
| 2016/0124817 | A1* | 5/2016 | Markus .............. G06F 11/1658 714/4.12 |

OTHER PUBLICATIONS

"Interface GridCache<K,V>", http://gridgain.com/api/javadoc/org/gridgain/grid/cache/GridCache.html, May 1, 2014, 8 pages.

"In-Memory Data Grid—Hazelcast | Documentation", version 3.0.0, http://docs.hazelcast.org/docs/3.0/manual/html-single/, Oct. 11, 2013, 74 pages.

Ivanov, Nikita, "Pearls of Distributed Programming at Philly's Scala Meetup", http://gridgaintech.wordpress.com/page/3/, Apr. 15, 2013, 22 pages.

\* cited by examiner

DATA COMMUNICATION IN A DISTRIBUTED DATA GRID

The present disclosure pertains to computer systems; more specifically, to changes of topology of nodes in a data grid.

BACKGROUND

Data, such as software programs, information, or other forms of data, has become a resource and asset for many individuals and businesses. A data grid can be a distributed database system that can store and manage data across multiple nodes, particularly when the amount of data is relatively large. For example, the data grid can be a collection of nodes (e.g., a node cluster) with an increased computing power and storage capacity. Data grids can provide functionalities such as querying or searching, processing for streaming data, and transaction capabilities.

Traditionally, when performing a functionality such as a query or search, the size of the data grid is limited to a memory capacity of one or more nodes in the data grid. Traditionally, to search data in a data grid, a map/reduce application may be used. A map/reduce application can provide distributed processing for large data sets in a data grid. The map/reduce application can include two phases, a map phase and a reduce phase. In the map phase, a master node can initiate a task such as a query, and divide the task between multiple nodes, e.g., communicate map tasks to different nodes in the data grid. The nodes that receive the map tasks can execute the map task and return results back to the master node, e.g., the nodes in the data grid can search for data in the memories of the nodes and communicate data matching search criteria back to the master node.

When the master node receives the data, the master node can then implement the reduce phase. In the reduce phase, the master node can aggregate the received data and remove duplicate data, e.g., reduce the data results. When the master node has completed the reduce phase, the master node can communicate the reduced data to the querying application. While the map/reduce application can be used to query data in a data grid, the scalability of the data grid can be limited. For example, where the nodes execute the map tasks and return the results back to the master node, the amount of data stored in the nodes of the data grid cannot exceed the memory capacity of the master node, otherwise an out of memory (OOM) condition can occur when the memory of the master node is filled and the nodes continue to send result data to the master node.

DESCRIPTION OF EMBODIMENTS

Figure 1:
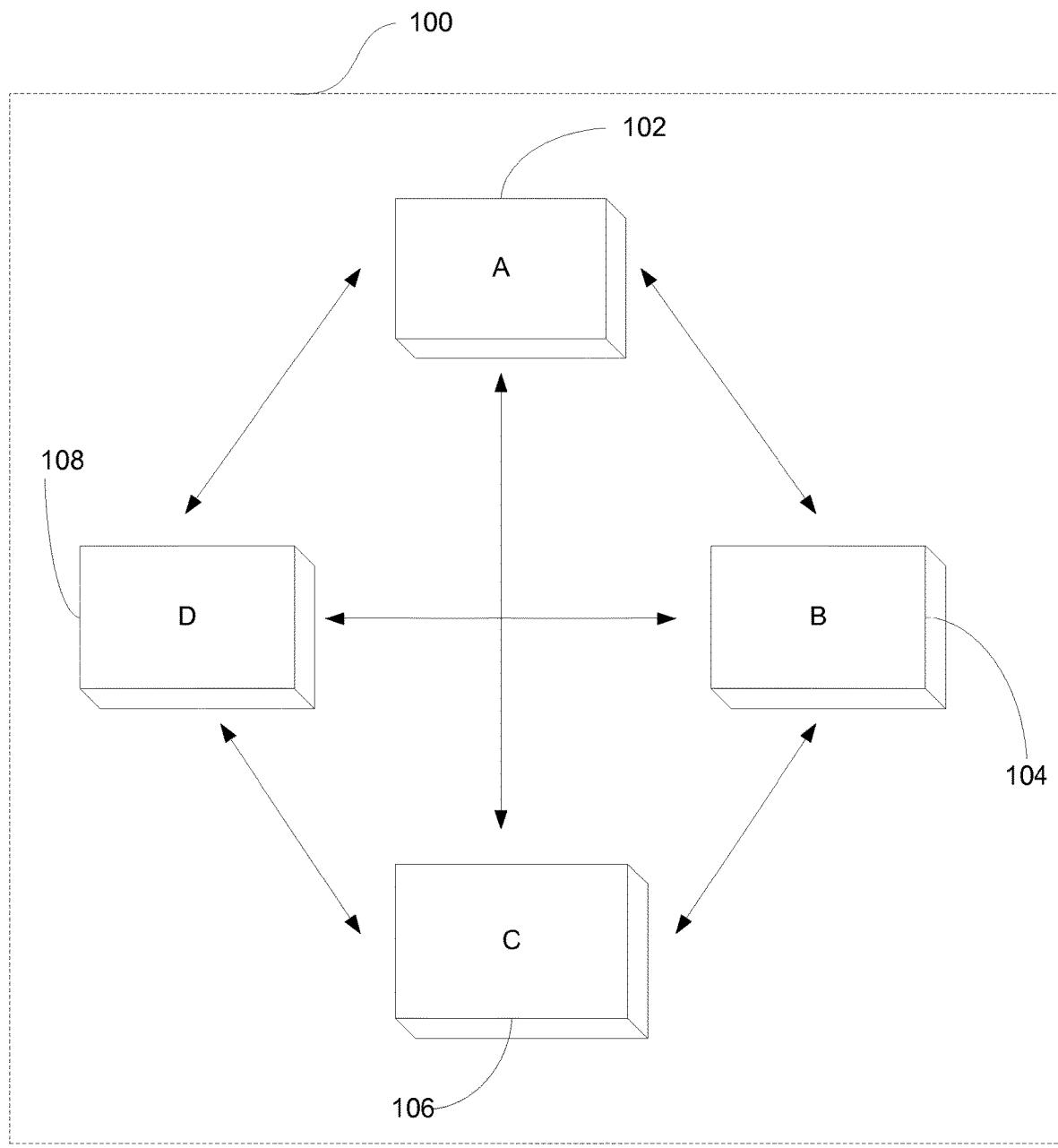
FIG. 1 illustrates a block diagram of nodes in a cluster according to one embodiment.

Data transfer technologies pertaining to data grids are described herein.

Data grids can manage distributed data, where the data can be stored across multiple locations and multiple types of storage devices. The data grid can be a collection of nodes (e.g., a node cluster), where each node has a memory, such as a cache, for storing data. Storing data at different nodes in a node cluster or different node clusters can provide increased data access rates and data security for individuals or businesses.

A distributed data grid can be scaled linearly as more servers are added to the cluster. For example, as a memory usage in a data grid increases, nodes can be added to a data grid to provide for additional memory storage. When a user desires to access data in the data grid, an application can query or search data stored in the data grid using an iteration process. An iterator can be used to search or query the data grid for information. For example, the data grid can contain demographic information for a city, e.g., names, ages, gender, height, weight, ethnicity, and so forth of individuals residing in the city. In this example, an application may request a search of information in the data grid to determine a number of male residents over the age of 35.

The requesting application can send a search query to an iterator of an iterator node. The iterator can be a module or application hosted by one of the nodes of the data grid. The iterator can then send a search request to different nodes in the data grid. As the different nodes find information that matches search criteria of the search request, the nodes can send the requested information back to the iterator for processing. The iterator can process the information and send the search result data to the requesting application. The iterator can include memory to store the information received from the different nodes in the data grid matching the search criteria. However, as a size of a data grid increases and additional information is stored in the data grid, the memory of the iterator may not be able to store all of the information communicated to the iterator from the nodes during a query. Traditionally, the size of the data grid is limited in view of the memory capacity of the iterator. For example, the data grid size is limited to an amount of data and/or a number of nodes that may return an amount of data for a search query that does not exceed the memory capacity of the iterator. Although a size of the memory of the iterator can be increased, traditionally the scalability of a data grid is limited to the memory capacity of the iterator.

Aspects of the present disclosure address the above noted deficiency by using a size parameter (e.g., chuckSize) configuration for an iteration process of a data grid. The chuckSize configuration can limit how much data, such as how many values of a key value pair, may be available at a time in the memory of the iterator to wait for processing by the iterator. The iterator can communicate a memory capacity limit to the nodes in the data grid. The nodes can use counters to track or count an amount of information communicated to the iterator at a time. When a memory capacity limit of the iterator is reached, the nodes can pause communicating the data to the iterator until the iterator can process the received data and remove the data from the memory of the iterator. The size parameter configuration can be used to limit an amount of data communicated to the iterator at a time to prevent an out of memory (OOM)

condition from occurring. An advantage of using a chuck-Size configuration for an iteration process can be to increase the scalability of the data grid. For example, where the OOM condition can be avoided, a number of nodes that can be added to the data grid is not limited by the memory capacity of the iterator.

FIG. 1 illustrates a block diagram of nodes 102, 104, 106, and 108 in a cluster 100. Nodes 102, 104, 106, and 108 can be physical machines, virtual machines, computers, servers, collections of physical machines or virtual machines, and so forth. The nodes 102, 104, 106, and 108 can each include a memory (such as a cache) for storing data. The nodes 102, 104, 106, and 108 can communicate with the other nodes 102, 104, 106, and 108, respectively, in the cluster 100. In one example, node 102 can communicate with nodes 104, 106, and/or 108 regarding the distribution of data in the cluster 100, such as where different data sets should be stored or where new data should be entered. In another example, node 104 can communicate with nodes 102, 106, and/or 108 regarding an amount of data that has been communicated to the iterator.

A memory at a node can include multiple cache entries, where each cache entry includes a key and a value pair, i.e. a (key, value) pair. The (key, value) pair can include an identification (ID) value (the key) that is associated with data (the value). For example, the (key, value) pair can be an ID value associated with information about a person, e.g., (ID, Person). The (key, value) pair can be used to perform different functions at nodes in a data grid, such as data reads, data writes, or data deletions.

Figure 2:
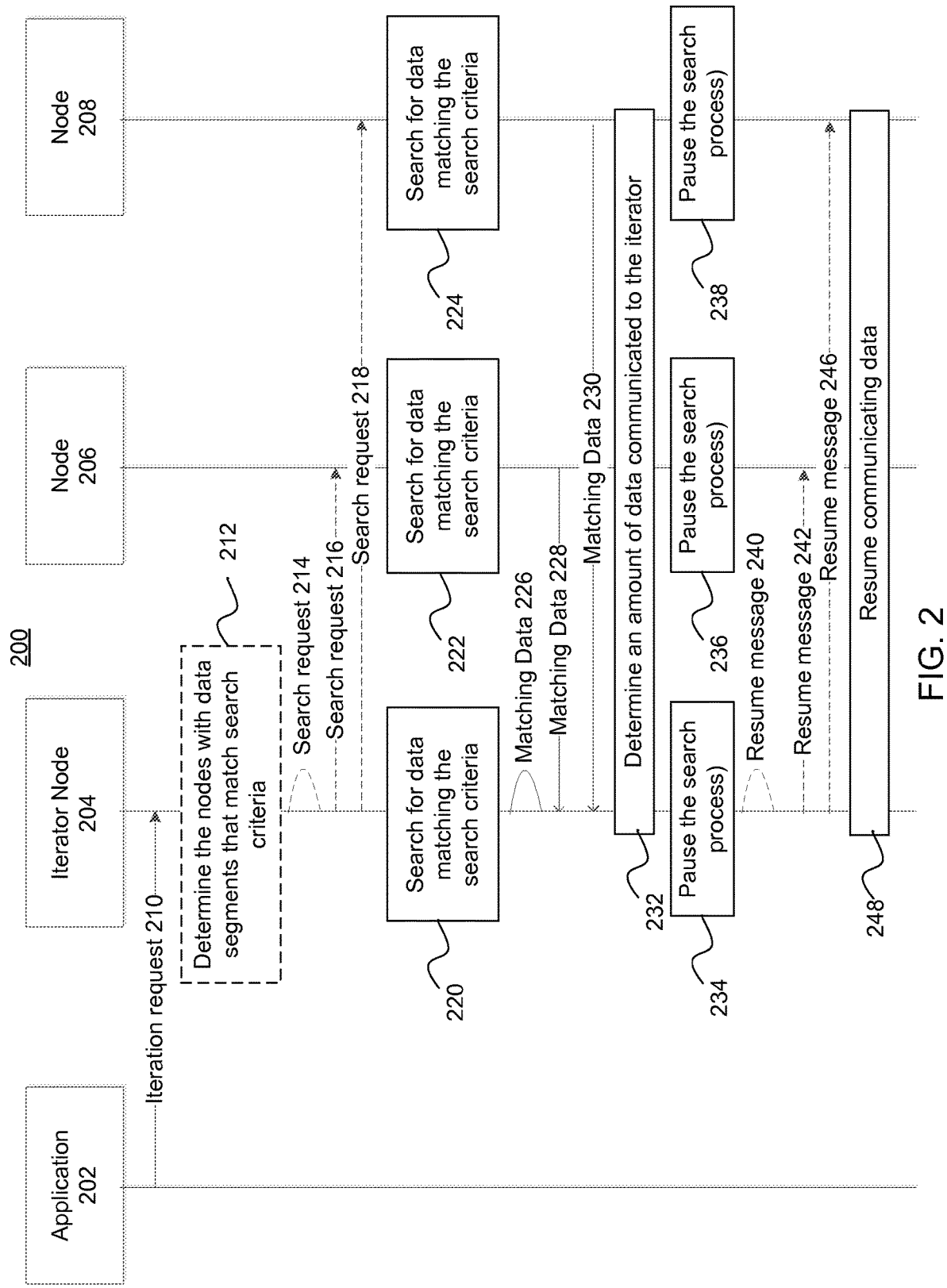
FIG. 2 depicts a sequence diagram of a method of an iteration process in a distributed data grid with an iterator using a size parameter configuration according to one embodiment.

FIG. 2 depicts a sequence diagram of a method 200 of an iteration process in a distributed data grid with an iterator using a size parameter configuration. Method 200 may be performed by processing logic that may comprise hardware (e.g., circuitry, dedicated logic, programmable logic, microcode, etc.), software (such as operations being performed by the MCU), firmware or a combination thereof. In one example, method 200 is performed by a processor, a plurality of processors, a processor core, and/or a plurality of processor cores. Alternatively, other components of a computing system or software executing on the processor may perform some or all of the operations of the method 200.

Referring to FIG. 2, the method 200 can begin with an application 202 communicating an iteration request to a node 204 in the data grid to an iterator registered or installed on the node 204 (e.g., an iterator node) (step 210). The iterator can be an application registered on the iterator node 204. The iterator can determine that memories of the nodes 204, 206, and/or 208 in the data grid include data segments that match search criteria of the iteration request (step 212). For example, the application 202 can communicate an iteration request for information about individuals at a given location. In this example, the nodes 204, 206, and/or 208 can store information that can be searched during the iteration process (including information about individuals) and the iterator can store a list of nodes with memories that include general demographic information or demographic information of a particular location. The iterator can communicate a search request to the nodes 204, 206, and/or 208 in the data grid, requesting data segments that match the search criteria (steps 214-218). The search request can include memory capacity information of the memory for the iterator (e.g., size parameter information).

Nodes 204, 206, and/or 208 can search in the memories of the respective nodes for data that matches the search criteria (steps 220-224). The nodes 204, 206, and/or 208 can communicate, to the iterator, the data matching the search criteria (result data) as the nodes 204, 206, and/or 208 find the matching data (steps 226-230). In one example, the nodes 204, 206, and/or 208 can search and retrieve data from a local memory at the nodes 204, 206, and/or 208. In another example, the nodes 204, 206, and/or 208 in the data grid can include a loader that can retrieve data from another location, such as a database or remote memory, when the data is not stored in at a local memory (such as a cache) of the nodes 204, 206, and/or 208. The loader can then load the retrieved data into the local memory of the nodes 204, 206, and/or 208, respectively, and the nodes 204, 206, and/or 208 can determine when the retrieved data matches the search criteria.

As the nodes 204, 206, and/or 208 communicate the matching data to the iterator, the nodes can communicate with each other to determine an amount of result data that has been communicated to the iterator (step 232). For example, the nodes 204, 206, and/or 208 can have local counters that count the amount of result data communicated to the iterator. In one example, the nodes 204, 206, and/or 208 can communicate the result data to the iterator simultaneously or in parallel. In another example, the nodes 204, 206, and/or 208 can communicate the result data to the iterator sequentially, e.g., one node at a time. An advantage of communicating the data to the iterator sequentially can be to reduce a likelihood or probability of an OOM condition. For example, when the memory is nearly full and two nodes communicate data simultaneously to the iterator, an OOM condition can occur when the memory of the iterator does not have the capacity to store the data from both the nodes. In this example, when the data is communicated sequentially then the occurrence of the OOM condition can be reduced or eliminated as the two data sets may not be communicated to the iterator at the same time.

In one example, the nodes 204, 206, and/or 208 can determine an amount of memory remaining at the iterator in view of the amount of data communicated to the iterator and the memory capacity of the iterator. In view of the amount of memory remaining at the iterator, the nodes 204, 206, and/or 208 can communicate an amount of data (e.g., data packets) that is less than or equal to the remaining memory capacity at the iterator. In one example, when the nodes 204, 206, and/or 208 communicate data to the iterator simultaneously, the nodes 204, 206, and/or 208 can communicate between the nodes to coordinate what data to send to the iterator. For example, the nodes 204, 206, and/or 208 can communicate between the nodes to determine that each node can send an amount of data up to ⅓ of the memory capacity of the iterator. In another example, the iterator can communicate amount of data (e.g., chunk sizes) that the nodes 204, 206, and/or 208 can communicate to the iterator during a communication session. In one example, the chunk sizes can be predetermined sizes. In another example, the iterator can determine a size of the memory of the iterator node and set a chunk size in view of the size of the memory. In one example, the chunk sizes for the nodes 204, 206, and/or 208 can be the same (such as 50 mb for each node). In another example the chunk sizes for the nodes 204, 206, and/or 208 can be different. For example, the iterator can communicate a chunk size of 40 MB to node 206 and a chunk size of 60 MB to node 208. When the node 206 communicates 40 MB to the iterator, the node 206 may then pause communicating result data in view of a memory capacity threshold (as discussing in more detail in the proceeding paragraphs) until the iterator indicates that the node 206 can resume (e.g., a resume condition), and similarly for the second node.

In one example, when the nodes 204, 206, and/or 208 communicate to the iterator sequentially, the iterator can communicate a chunk size of data to communicate to the iterator or a memory capacity of the iterator and the nodes 204, 206, and/or 208 can use the local counter to track how much information has been communicated to the iterator. The nodes 204, 206, and/or 208 can adjust an amount of data communicated to the iterator to be less than or equal to the chunk size or the amount of memory remaining at the iterator. In one example, node 206 may previously have been communicating data to the iterator and when the node 206 finishes communicating the data, then the node 206 can indicate to the node 208 to communicate data to the iterator and an amount of chunk size remaining at the iterator. In another example, when the node 206 finishes communicating data to the iterator, the iterator can send a message to the node 208 requesting that the node 208 communicate data and indicate in the message the chunk size remaining at the iterator.

In another example, the iterator can monitor an average or maximum data packet size communicated from the nodes 204, 206 and/or 208 over a period of time. The iterator can determine that the nodes 204, 206 and/or 208 communicate an average or maximum data packet size of 10 mb or less. In this example, the iterator can switch from requesting data be sent sequentially from the nodes 204, 206, and/or 208 to a mode where data is send in parallel when the average or maximum data packet size is below a threshold amount.

When the amount of data communicated to the iterator node reaches a memory capacity limit of the memory of the iterator, the nodes 204, 206, and 208 can pause the search process while the iterator processes the search data (steps 234-238). In one example, when the nodes 204, 206, and 208 pause the search process, the nodes 204, 206, and 208 can cease searching the memories of the nodes 204, 206, and 208 until the nodes receive a resume message (e.g., a resume condition) from the iterator (steps 240-246). In another example, when the nodes pause the search process the nodes can cease searching the memories of the nodes 204, 206, and 208 for a predefined period of time before resuming searching for the memories of the nodes 204, 206, and 208. In another example, when the nodes pause the search process the nodes can continue to search the data in the memories of the respective nodes 204, 206, and 208 and store the matching data in a local memory of the nodes 204, 206, and 208 until the search process resumes. The search process may resume when a resume condition occurs, such as when the nodes receive the resume message or the predefined period of time expires. When the iterator finishes processing the received data from the nodes and the iteration process resumes, the nodes 204, 206, and/or 208 can continue to communicate result data to the iterator (step 248). The nodes 204, 206, and 208 can repeat the steps of pausing and resuming the iteration process until the data in the memory of the nodes 204, 206, and 208 can be searched through and the result data can communicated to the iterator.

Figure 3:
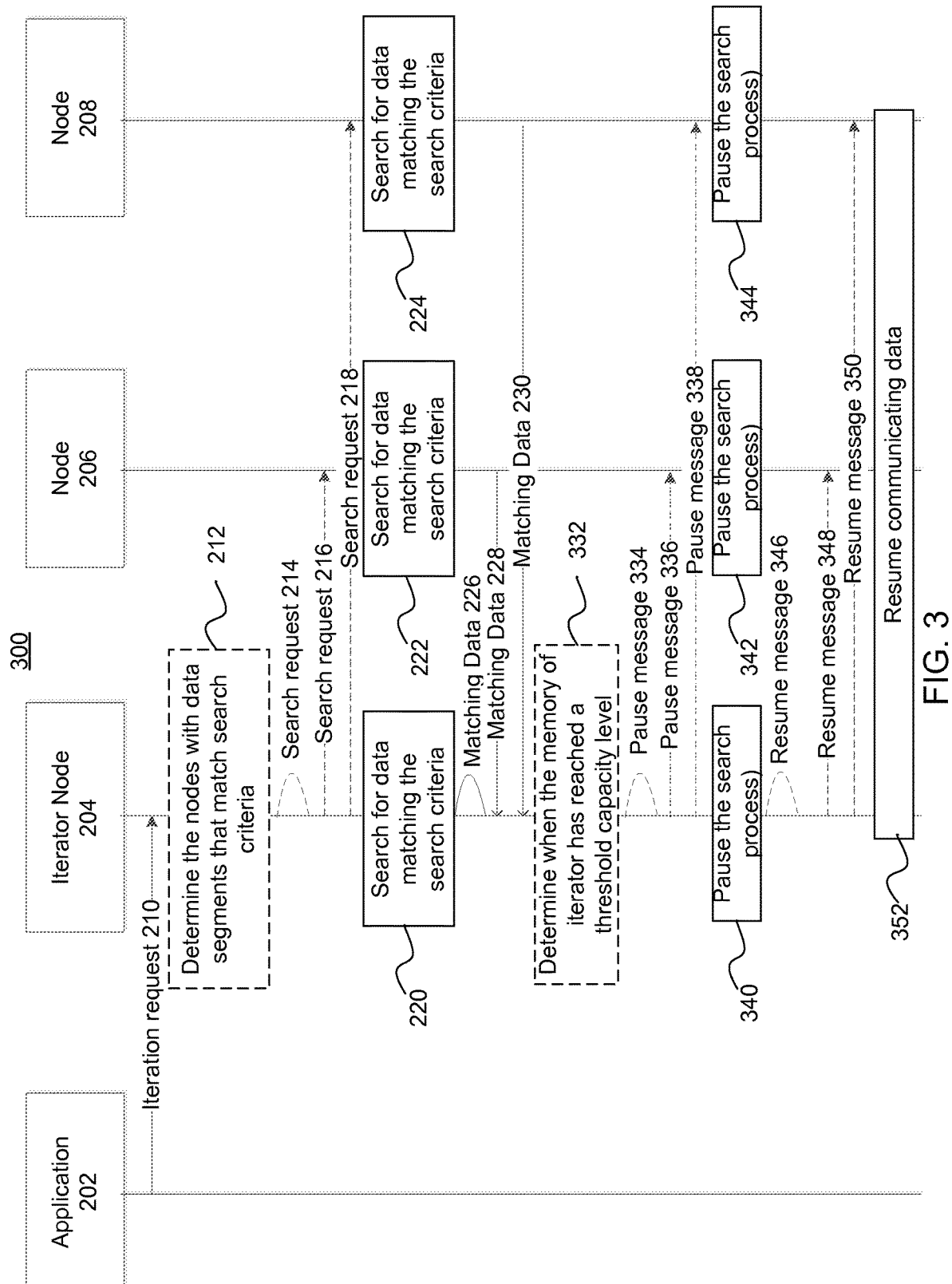
FIG. 3 depicts a sequence diagram of another method of an iteration process in a distributed data grid with an iterator using a size parameter configuration according to one embodiment.

FIG. 3 depicts a sequence diagram of a method 300 of an iteration process in a distributed data grid with an iterator using a size parameter configuration. Method 300 may be performed by processing logic that may comprise hardware (e.g., circuitry, dedicated logic, programmable logic, microcode, etc.), software (such as operations being performed by the MCU), firmware or a combination thereof. In one example, method 300 is performed by a processor, a plurality of processors, a processor core, and/or a plurality of processor cores. Alternatively, other components of a computing system or software executing on the processor may perform some or all of the operations of the method 300.

Referring to FIG. 3, the method 300 is the same as the method discussed in the preceding paragraphs for FIG. 2 through the step of the nodes 204, 206, and/or 208 communicating the data matching the search criteria (result data) to the iterator (steps 226-230). As the nodes 204, 206, and/or 208 communicate the matching data to the iterator, a counter at the iterator can determine when a memory of the iterator has reached a threshold capacity level (step 332). For example, the counter at the iterator can determine the capacity of the memory of the iterator and can count or track an amount of data received from the nodes 204, 206, and/or 208 at the iterator. When the amount of data communicated to the iterator node reaches a threshold capacity level, the iterator can communicate a pause message to the nodes 204, 206, and/or 208 indicating to the nodes 204, 206, and/or 208 to pause the search processes while the iterator processes the result data (steps 334-338). When the nodes 204, 206, and/or 208 receive the pause message, the nodes 204, 206, and/or 208 can pause the search process while the iterator processes the search data (steps 340-344). When the iterator processes the search data, the iterator can send a resume message to the nodes 204, 206, and 208 indicating that the nodes 204, 206, and 208 can resume the iteration process (steps 346-350). When the nodes 204, 206, and/or 208 receive the resume message, the nodes 204, 206, and/or 208 can continue to search for and communicate result data to the iterator (step 352). The nodes 204, 206, and 208 can repeat the steps of pausing and resuming the iteration process until the memories at the nodes 204, 206, and 208 can be searched through and the result data can communicated to the iterator.

In one example, when the iteration process has completed, the memory for the iterator at the iterator node can be cleared and the iterator can be removed from the iterator node. In another example, the memory for the iterator at the iterator node can be cleared and the iterator can continue to be registered at the iterator node.

In one example, the search criteria can include a filter and a converter that can be used at the nodes 204, 206, and/or 208 to reduce network chattiness and increase a performance of the data grid. The filter can represent an application to match requested data from the application 202 with a subset of data at nodes 204, 206, and/or 208. For example, a data set can include the names and ages of multiple people and the filter can select people with an age above 18 years old. A converter can represent an application to extract information from the subset of data at the nodes 204, 206, and/or 208. For example, the converter can extract information from the data subset (e.g., relevant bits) of the filtered data and pass the information to the iterator. For example, a search may be for names of people over 25. In this example, the filter can be used by a node to find information for the people over the age of 25 and the converter can send only the names people selected by the filter, e.g., the converter can remove the age info from the filtered data before the data may be sent to the iterator. One advantage of using the filter and the converter can be to reduce network traffic by enabling the nodes 204, 206, and/or 208 to communicate relevant data to the iterator. For example, an amount of data (such as data entries) sent to the iterator can be limited to the relevant data, e.g., the names of the people over 25 years old. In another example, the iterator can communicate a data format for nodes to communicate data to the iterator and the converter can convert a data format of result data to the data format communicated by iterator. The data format communicated by the iterator can be a data format that is compatible with the iterator and/or the application 202.

Figure 4:
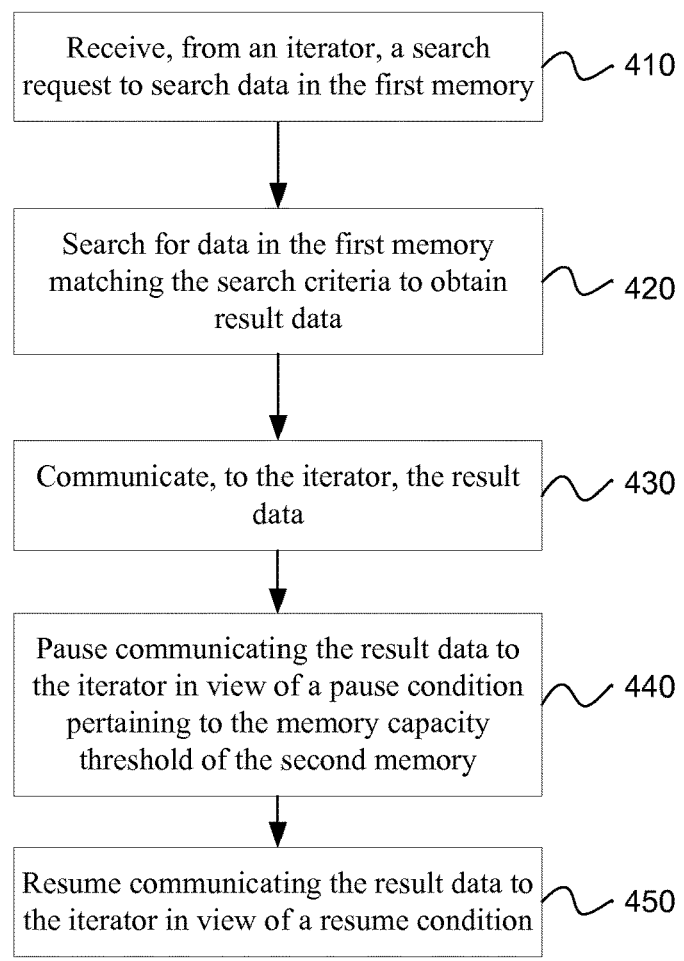
FIG. 4 depicts a flow diagram of a functionality of a first node including a memory to store data of the first node and a processor coupled to the memory according to one embodiment.

FIG. 4 is a flow diagram of a functionality 400 of a first node including a memory to store data of the first node and a processor coupled to the memory. Method 400 may be performed by processing logic that may comprise hardware (e.g., circuitry, dedicated logic, programmable logic, microcode, etc.), software (such as operations being performed by the MCU), firmware or a combination thereof. In one example, method 400 is performed by processor, a plurality of processors, a processor core, and/or a plurality of processor cores. Alternatively, other components of a computing system or software executing on the processor may perform some or all of the operations of the method 400.

The processor can receive, from an iterator, a search request to search data in the first memory (block 410). In one example, the search request can include search criteria defined by a search query of the data grid and a memory capacity threshold of a second memory coupled to the iterator. The processor can further search for data in the first memory matching the search criteria to obtain result data (block 420). The processor can further communicate, to the iterator, the result data (block 430). The processor can further pause communicating the result data to the iterator in view of a pause condition pertaining to the memory capacity threshold of the second memory (block 440). For example, the pause condition can occur when the memory capacity of the iterator is full. The processor can further resume communicating the result data to the iterator in view of a resume condition (block 450). For example, when the iterator has processed the result data, the memory of the iterator may no longer be full and the iterator memory may continue to receive result data.

In one example, the pause condition can include communicating, by the first node, a threshold amount of result data to the iterator (e.g., communicating an amount of result data that may exceed a predefined or threshold amount of data). The threshold can be less than a memory capacity of the memory of the iterator. For example, multiple nodes can communicate result data to the iterator and the threshold can be a portion of the iterator memory capacity allotted to one of the multiple nodes. In another example, the pause condition can include communicating, with other nodes in the data grid, to determine an amount of result data communicated by the first node and the other nodes to the iterator and determining when the amount of result data communicated by the first node and the other nodes reaches or exceeds a threshold amount of data. In another example, the pause condition can include receiving, from the iterator, a pause message indicating to the first node to pause communicating result data to the iterator. In another example, the resume condition can include receiving, from the iterator, a resume message, wherein the resume message indicates to the first node to resume communicating result data to the iterator. In another example, the search request can include a predetermined length of time for the first node to pause communicating result data when a pause condition occurs. In another example, the resume condition comprises an expiration of the predetermined length of time.

Figure 5:
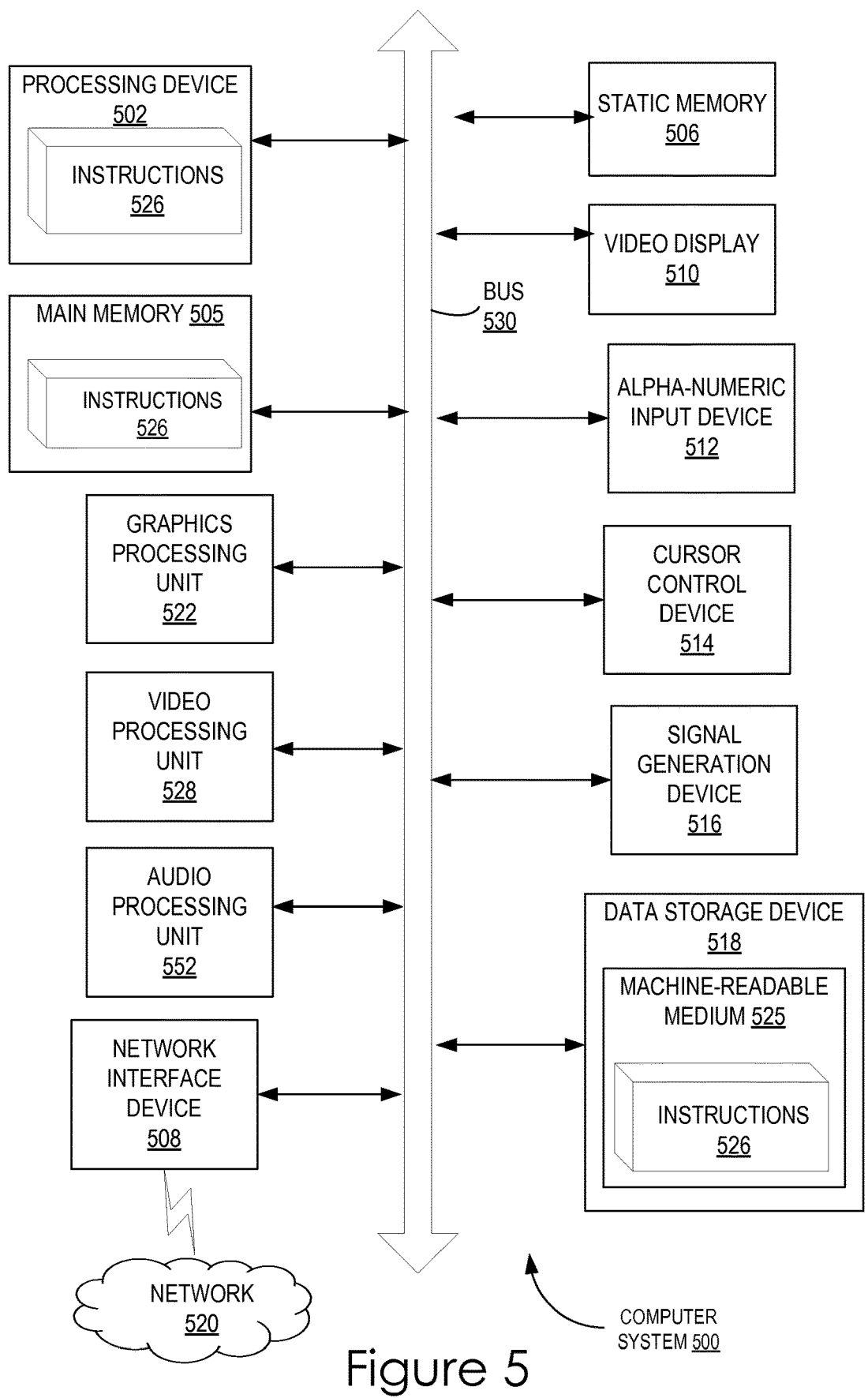
FIG. 5 illustrates a block diagram of one implementation of a computer system.

FIG. 5 illustrates a diagrammatic representation of a machine in the exemplary form of a computer system 500 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 522. The computer system 500 also may include a video display unit 508 (e.g., a liquid crystal display (LCD), a cathode ray tube (CRT), or a touch screen), an alphanumeric input device 510 (e.g., a keyboard), a cursor control device 514 (e.g., a mouse), and a signal generation device 516 (e.g., a speaker).

The data storage device 518 may include a machine-readable storage medium 524 on which is stored one or more sets of instructions 526 (e.g., software) embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting computer-readable storage media. The instructions 526 may further be transmitted or received over a network 520 via the network interface device 534.

While the machine-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium"

shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A first node, comprising:
   a first memory to store data as one or more cache entries of a distributed cache distributed over a grid of nodes comprising at least the first node and an iterator node;
   a first processor coupled to the first memory, the first processor to:
   receive, over a network from a second processor of the iterator node, a search request to search the data in the first memory, wherein the search request corresponds to a search query of the grid received at the iterator node and wherein the search request comprises:
   search criteria defined by the search query; and
   a memory capacity threshold of a second memory coupled to the second processor of the iterator node;
   identify result data comprising data in the first memory that matches the search criteria;
   communicate, to the iterator node, the result data;
   determine whether pause criteria of a pause condition is satisfied, the pause condition pertaining to the memory capacity of the second memory exceeding the memory capacity threshold during communication of the result data, wherein the memory capacity of the second memory is determined in view of an amount of result data communicated by the first node and by other nodes to the iterator node;
   in response to satisfying the pause criteria of the pause condition, pause communicating the result data to the iterator node for at least a predetermined length of time, wherein the pause condition is to prevent an out of memory (OOM) condition from occurring at the iterator node, wherein prevention of the OOM condition improves communication efficiency and network bandwidth in the grid of nodes;
   determine that the predetermined length of time is satisfied and that a resume criteria of a resume condition is satisfied responsive to receiving, from the iterator node, a resume message, wherein the resume message indicates to the first node to resume communicating result data to the iterator node, the resume condition pertaining to memory capacity of the second memory falling below the memory capacity threshold; and in response to satisfying the resume criteria of the resume condition, resume communicating the result data to the iterator node.

2. The first node of claim 1, wherein the pause criteria of the pause condition comprises communication, by the first node, of a threshold amount of the result data to the iterator node prior to pausing the communicating, the threshold amount associated with the memory capacity threshold of the second memory.

3. The first node of claim 1, further comprising determining whether the pause criteria of the pause condition is satisfied by:
communicating, with other nodes in the grid, to determine the amount of the result data communicated by the first node and the other nodes to the iterator node; and
determining when the amount of result data communicated by the first node and the other nodes comprises a threshold amount of data that is associated with the memory capacity threshold of the second memory.

4. The first node of claim 1, wherein the pause criteria of the pause condition is satisfied responsive to receiving, from the iterator node, a pause message indicating to the first node to pause communicating result data to the iterator node in view of the memory capacity threshold.

5. The first node of claim 1, wherein the search request further comprises the predetermined length of time for the first node to pause communicating the result data when the pause condition occurs.

6. The first node of claim 5, wherein the resume condition comprises occurrence of an expiration of the predetermined length of time.

7. An iterator node, comprising:
a first memory coupled to the iterator node to store data, wherein the iterator node is coupled to a first node and a second node in a grid of nodes;
a processor coupled to the first memory, the processor to:
receive, from an application, a search query of the grid;
communicate, over a network to the first node in the grid, a search request corresponding to the search query, the search request to search for data in a second memory of the first node, wherein the search request comprises:
search criteria defined by the search query; and
a memory capacity threshold of the first memory;
receive, from the first node, result data comprising the data in the second memory that matches the search criteria;
determine whether pause criteria of a pause condition is satisfied, the pause condition pertaining to the memory capacity of the first memory exceeding the memory capacity threshold during communication of the result data, wherein the memory capacity of the second memory is determined in view of an amount of result data communicated by the first node and by other nodes to the iterator node;
in response to satisfying the pause criteria of the pause condition, pause receiving the result data from the second node for at least a predetermined length of time, wherein pause condition is to prevent an out of memory (OOM) condition from occurring at the iterator node, wherein prevention of the OOM condition improves communication efficiency and network bandwidth in the grid of nodes;
determine that the predetermined length of time is satisfied and that a resume criteria of a resume condition is satisfied, the resume condition pertaining to memory capacity of the first memory falling below the memory capacity threshold;
responsive to determining the resume criteria is satisfied, sending, from a resume message to the first node, the resume message indicating to the first node to resume communicating result data to the iterator node; and
resume, in view of the resume message, receiving the result data from the first node.

8. The iterator node of claim 7, wherein the processor is further to receive, from the application, an iteration request, wherein the iteration request comprises the search criteria of the search query.

9. The iterator node of claim 7, wherein the processor is further to communicate, to the second node in the grid, a search request to search for data in a memory coupled to the second node.

10. The iterator node of claim 7, wherein satisfying the pause criteria comprises receiving, from the first node, a threshold amount of result data, wherein the threshold amount of result data is a memory capacity of the first memory.

11. The iterator node of claim 7, wherein the processor is further to communicate, to the first node, a pause message indicating to the first node to pause communicating the result data to the iterator node in view of the memory capacity threshold.

12. The iterator node of claim 7, wherein the pause criteria is a threshold length of time in view of a size of the first memory.

13. The iterator node of claim 7, wherein the search request comprises the predetermined length of time for the first node to pause when the pause criteria occurs.

14. The iterator node of claim 7, wherein the processor is further to:
communicate, to a third node in the grid, a second search request to search for data in a third memory of the third node;
receive, from the third node, second result data comprising data in the third memory that matches the search criteria;
pause receiving the result data from the third node in view of the pause condition; and
resume receiving the result data from the third node in view of the resume condition.

15. A method, comprising:
receiving, over a network from an iterator node in a grid of nodes, a search request to search data in a first memory of a first node of the nodes in the grid, wherein the search request corresponds to a search query of the grid received at the iterator node and wherein the search request comprises:
search criteria defined by the search query; and
a memory capacity threshold of a second memory coupled to the iterator node;
identifying, by a processor of the first node, result data comprising data in the first memory that matches the search criteria;
communicating, by the processor, the result data to the iterator node;
determining whether pause criteria of a pause condition is satisfied, the pause condition pertaining to the memory capacity of the second memory exceeding the memory capacity threshold during communication of the result data, wherein the memory capacity of the second memory is determined in view of an amount of result data communicated by the first node and by other nodes to the iterator node;

in response to satisfying the pause criteria of the pause condition, pausing communicating the result data to the iterator node for at least a predetermined length of time, wherein the pause condition is to prevent an out of memory (OOM) condition from occurring at the iterator node, wherein prevention of the OOM condition improves communication efficiency and network bandwidth in the grid of nodes;

determining that the predetermined length of time is satisfied and that a resume criteria of a resume condition is satisfied responsive to receiving, from the iterator node, a resume message, wherein the resume message indicates to the first node to resume communicating result data to the iterator node, the resume condition pertaining to memory capacity of the second memory falling below the memory capacity threshold; and in response to satisfying the resume criteria of the resume condition, resuming communicating the result data to the iterator node.

16. The method of claim 15, wherein satisfying the pause criteria comprises at least one of:

communicating, by the node, a threshold amount of result data to the iterator node and receiving, from the iterator node, a pause message indicating to the first node to pause communicating the result data to the iterator node; or communicating, with other nodes in the grid, to determine an amount of the result data communicated by the first node and the other nodes to the iterator node and determining when the amount of the result data communicated to the iterator node by the first node and the other nodes comprises a threshold amount of the result data;

wherein the threshold amount of data is associated with the memory capacity threshold.

17. The method of claim 15, wherein satisfying the resume criteria further comprises determining occurrence of an expiration of a predetermined length of time.

18. The method of claim 15, wherein the search request comprises the predetermined length of time for the first node to pause when the pause criteria occurs.

* * * * *